United States Patent [19]

Ichikawa et al.

[11] Patent Number: 5,291,526
[45] Date of Patent: Mar. 1, 1994

[54] DIGITAL SIGNAL REPRODUCING APPARATUS FOR REDUCING INFLUENCE BY JITTER

[75] Inventors: Kaori Ichikawa; Noriyuki Ohtsuka, both of Tokyo; Masunori Hashimoto, Nagano, all of Japan

[73] Assignee: Olympus Optical Co., Ltd., Tokyo, Japan

[21] Appl. No.: 838,558

[22] Filed: Feb. 19, 1992

[30] Foreign Application Priority Data

Feb. 28, 1991 [JP] Japan .................................. 3-57953

[51] Int. Cl.$^5$ ..................... H04L 7/04; G11B 20/00
[52] U.S. Cl. .................................. 375/111; 375/116; 375/118; 358/410
[58] Field of Search ................. 375/106, 110–111, 375/116–119; 358/410; 360/70–71, 73.01

[56] References Cited

U.S. PATENT DOCUMENTS

| 4,316,284 | 2/1982 | Howson | 375/116 |
| 4,611,335 | 9/1986 | Arai et al. | 375/110 |
| 5,140,618 | 8/1992 | Kinoshita et al. | 375/106 |

FOREIGN PATENT DOCUMENTS 57-24700   5/1982  Japan .
62-241176  10/1987 Japan .

Primary Examiner—Curtis Kuntz
Assistant Examiner—Young Tse
Attorney, Agent, or Firm—Frishauf, Holtz, Goodman & Woodward

[57] ABSTRACT

A fundamental period calculation circuit calculates a fundamental period in accordance with a plurality of pulses including reproduction target pulses included in binary reproduced output signal pulses sequentially input as digital signal pulses to be reproduced. A clock generator generates a demodulation clock having the fundamental period calculated by the fundamental period calculation circuit. A phase error amount detecting circuit detects a phase error amount in accordance with a phase difference between the demodulation clock generated by the clock generator and a plurality of pulses including the reproduction target pulses. A synchronizing circuit controls the phase error amount of a generation timing of the demodulation clock by the clock generator to a predetermined value in accordance with the phase error amount detected by the phase error amount detecting circuit so that the demodulation clock generated by the clock generator is synchronized with each of the reproduction target pulses. A demodulator sequentially demodulates the binary reproduced output signal pulses in accordance with the demodulation clock from the clock generator, the demodulation clock being synchronized with each of the reproduction target pulses with the predetermined phase error amount by the synchronizing circuit.

17 Claims, 11 Drawing Sheets

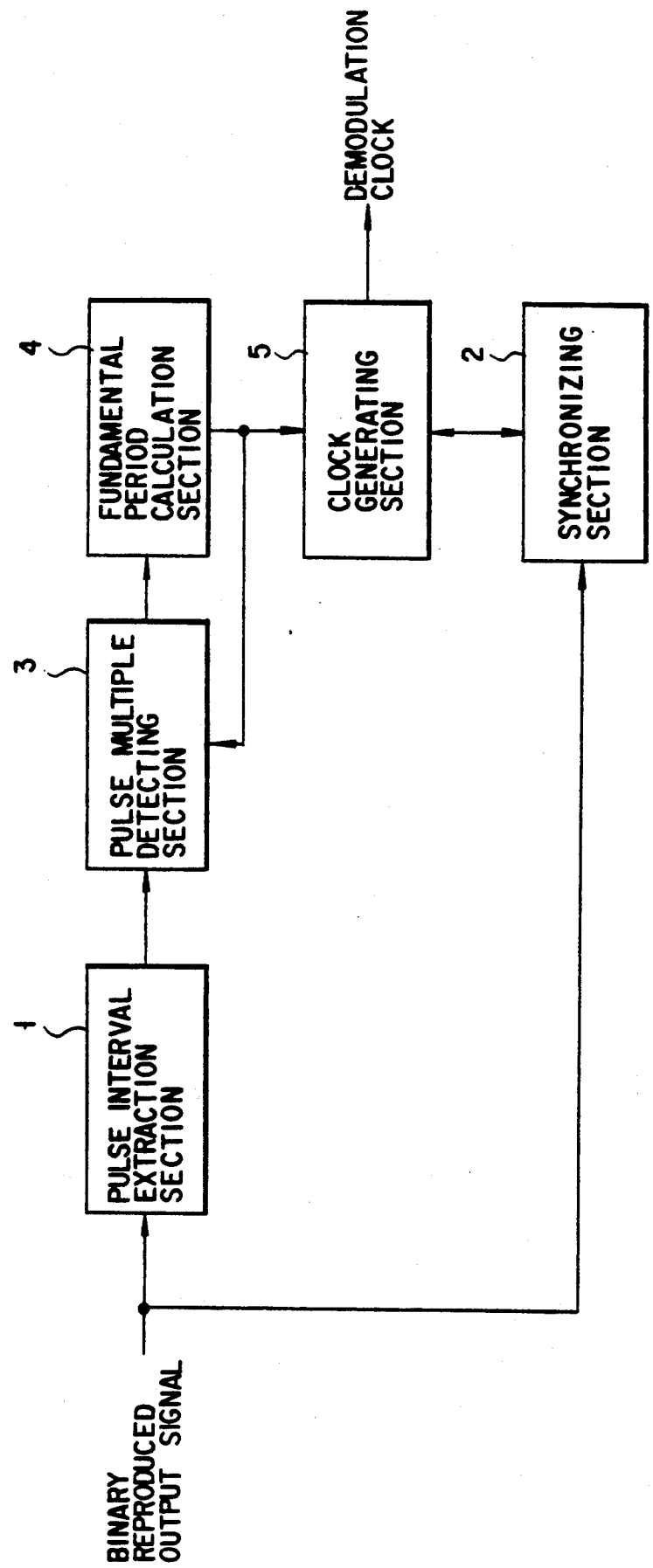
F I G. 1

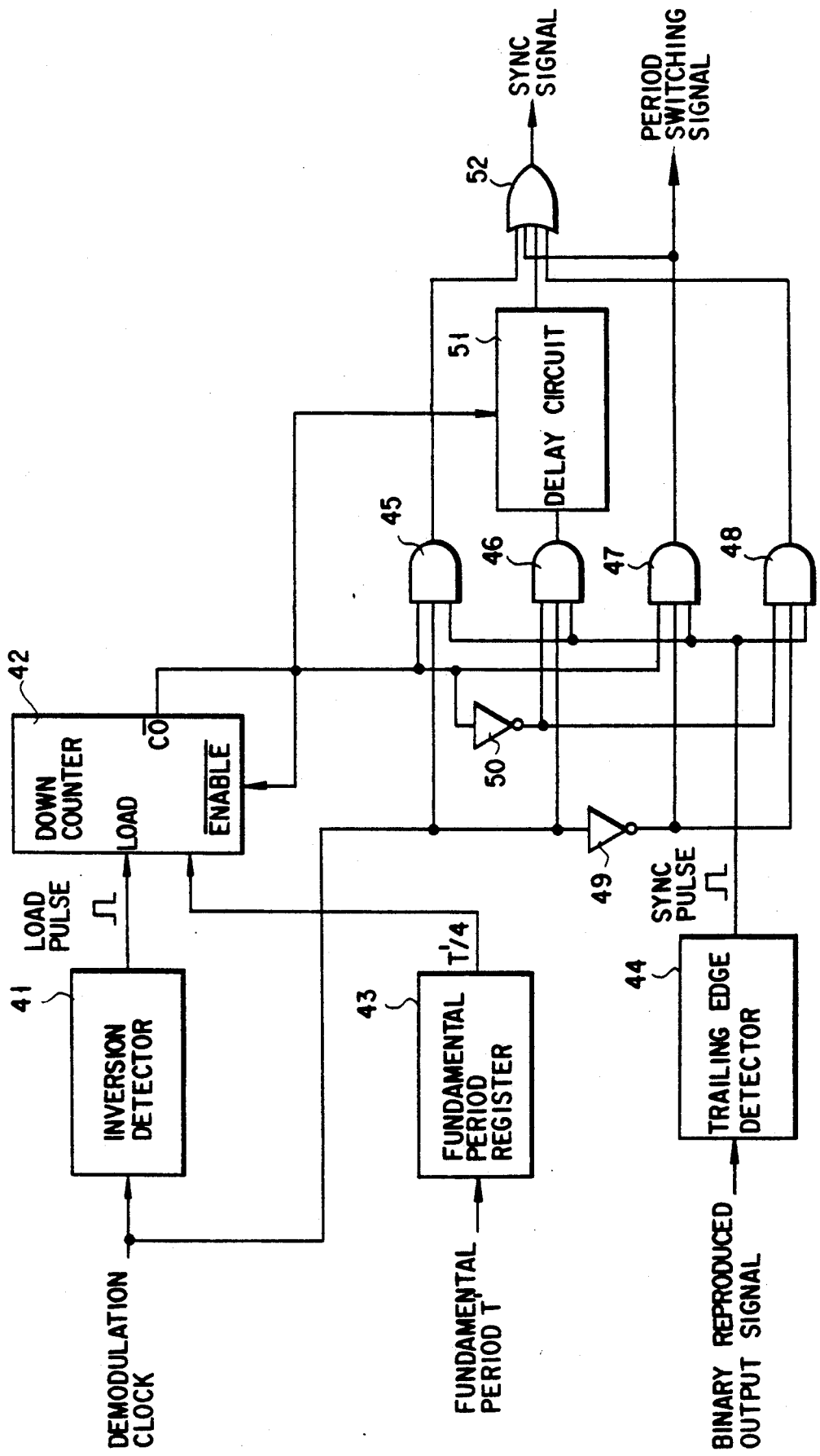
F I G. 6

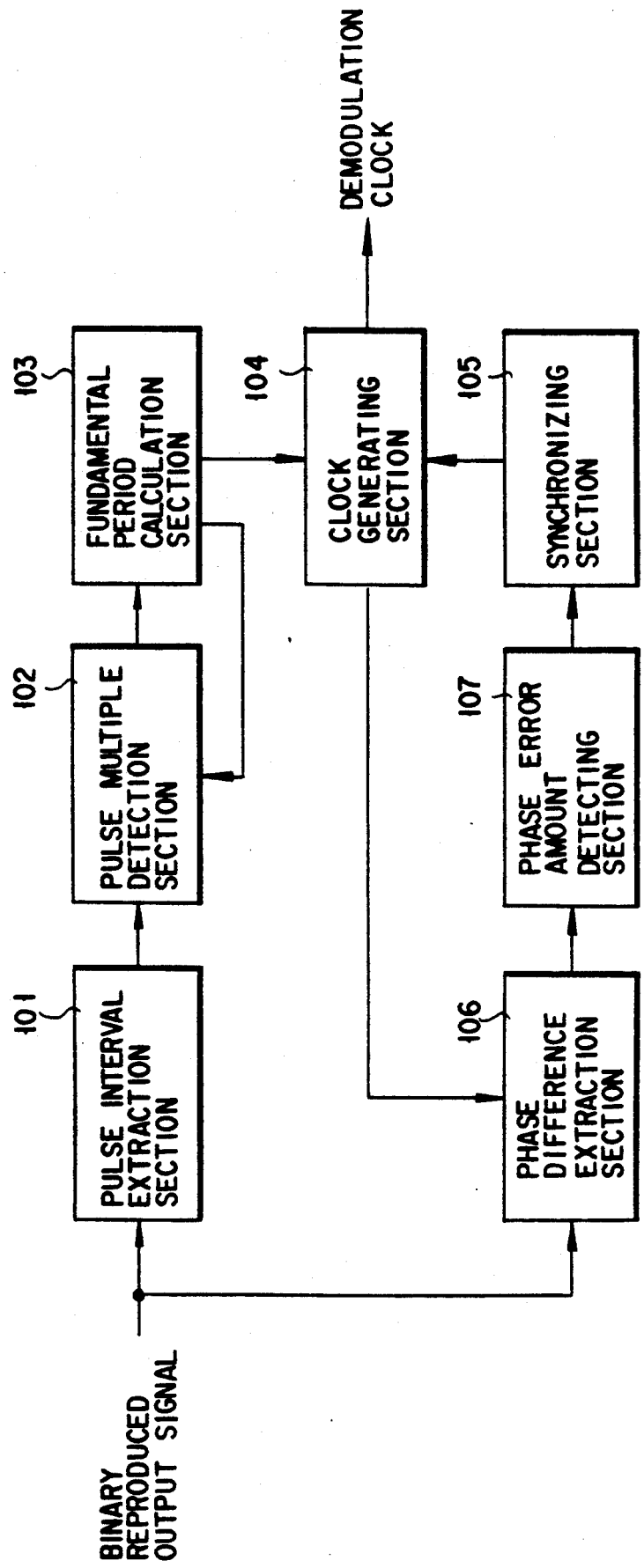
F I G. 9

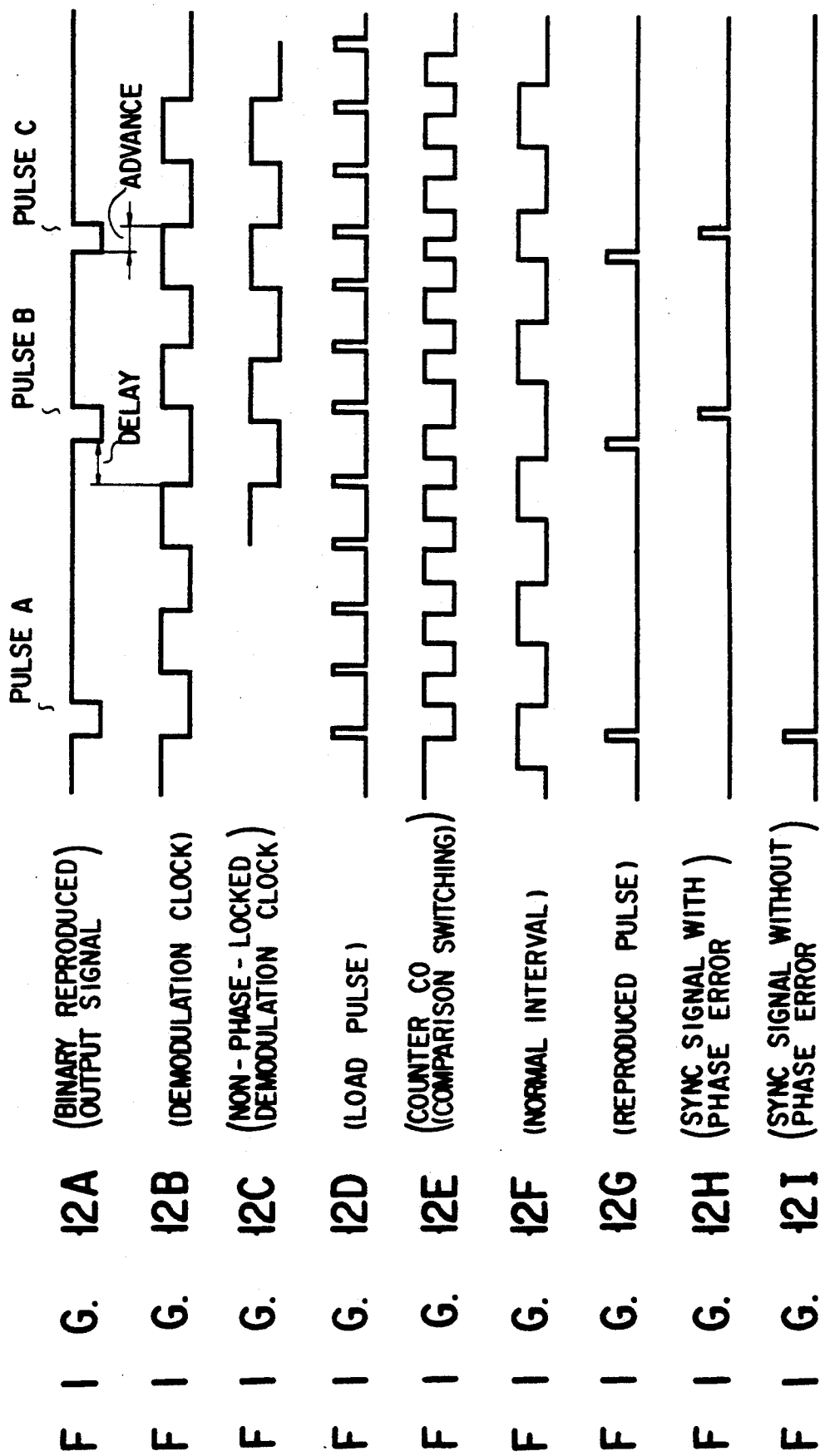

DIGITAL SIGNAL REPRODUCING APPARATUS FOR REDUCING INFLUENCE BY JITTER

BACKGROUND OF THE INVENTION

1. Field of the Invention

The present invention relates to a digital signal reproducing apparatus and, more particularly, to a digital signal reproducing apparatus for reproducing a digital signal recorded by an arbitrary self-clock scheme (e.g., an MFM modulation scheme or a 2-7 modulation scheme) on a recording medium such as a floppy disk, a magnetic card, an optical card, or an optomagnetic medium.

2. Description of the Related Art

Various conventional digital signal recording/reproducing schemes used in a variety of fields described above have been proposed. An arbitrary self-clock scheme has been generally used because it can extract a clock signal from a signal modulated during recording. In reproduction of a digital signal recorded by such an arbitrary self-clock scheme on a recording medium, a countermeasure against variations in reproduction pulse width caused by variations in relative speed between the recording medium and a read head and signal variations and omissions caused by damage and dust on the medium must be implemented to accurately demodulate the recorded digital signal regardless of the types of self-clock schemes.

Conventional digital signal reproducing apparatuses include an analog reproducing apparatus for feeding back a phase difference between a reproduced pulse and a self-oscillated clock pulse to a frequency to synchronize the reproduced pulse with a read pulse according to a PLL (Phase-Locked Loop), and a digital reproducing apparatus for reading pulses one by one using a reproduced pulse as a reference pulse to form a window signal.

The former analog prior art is disclosed in Published Examined Japanese Patent Application No. 57-24700 although the disclosed arrangement partially includes a digital arrangement. In the arrangement of this prior art, a read clock synchronized with a reproduced pulse is obtained by a PLL scheme for counting a phase difference between a reproduced pulse and a self-oscillated clock and feeding back a count value to the frequency of the self-oscillated clock. The reproduced pulse is demodulated by the read clock synchronized with the reproduced pulse.

The latter digital prior art is exemplified by Published Unexamined Japanese Patent Application No. 62-241176. In an arrangement proposed by this prior art, the period of a clock bit at a given moment is extracted from a pulse interval during reproduction at the given moment, a correction clock having a value ½ the period of the extracted clock bit as a reference period is generated, and a read window signal is formed on the basis of the correction clock, thereby demodulating a reproduced pulse.

In Published Examined Japanese Patent Application No. 57-24700 disclosing the arrangement wherein the phase difference between the reproduced pulse and the self-oscillated clock is fed back to the frequency of the self-oscillated clock to obtain the read clock synchronized with the reproduced pulse, once the phase of the reproduced pulse is stepped out from that of the read clock, it takes a long period of time to properly phase-lock the read clock with the reproduced pulse. In addition, tracking is delayed when variations in medium speed causing large pulse width variations occur. As a result, the reproduced pulse cannot be accurately demodulated, resulting in inconvenience.

In Published Unexamined Japanese Patent Application No. 62-241176 disclosing the arrangement wherein the period of the clock bit is extracted from the pulse interval corresponding to the reception timing of the pulse to form the demodulation window, the clock period varies upon reception of each pulse. For this reason, when the pulse position is abruptly changed due to variations in speed of the medium, a demodulation error occurs. For example, if the current pulse position is delayed from the normal position, the duration of a pulse preceding the current pulse is increased, and the duration of a pulse succeeding the current pulse is decreased. For this reason, when the clock period is increased in accordance with the preceding pulse, the next pulse does not reach within the window ON period, and accurate demodulation cannot be performed. For example, when the pulse width is abruptly increased by jitter (fluctuation of a one-shot signal) caused by damage and dust on the medium and the next pulse width is decreased, a bit cannot be fitted within the data window. As a result, the clock bit and the data bit are reversed in order to cause a demodulation error.

The latter digital prior art is susceptible to variations by jitter. More specifically, in an apparatus for reproducing a digital signal recorded on a recording medium, jitter caused by variations in read speed of the recording medium easily affects reproduction. At the same time, jitter such as variations in reproduced pulse width caused by damage and dust on the recording medium also adversely affects reproduction. It is, therefore, difficult to accurately demodulate a digital signal (data) modulated and recorded by an arbitrary self-clock scheme.

SUMMARY OF THE INVENTION

It is, therefore, an object of the present invention to provide a new and improved digital signal reproducing apparatus for reducing an influence by jitter which can accurately demodulate data modulated and recorded by an arbitrary self-clock scheme in reproduction of the digital signal recorded on the recording medium even if the read speed of the recording medium varies or the reproduced pulse width varies due to damage and dust on the recording medium.

According to an aspect of the present invention, there is provided a digital signal reproducing apparatus comprising:

fundamental period calculating means for calculating a fundamental period in accordance with a plurality of pulses including reproduction target pulses included in binary reproduced output signal pulses sequentially input as digital signal pulses to be reproduced;

clock generating means for generating a demodulation clock having the fundamental period calculated by the fundamental period calculating means;

synchronizing means for controlling an inversion timing of the demodulation clock by the clock generating means so that the demodulation clock generated by the clock generating means is synchronized with each of the reproduction target pulses with a predetermined width; and demodulating means for sequentially demodulating the binary reproduced output signal pulses in accordance with the demodulation clock from the clock generating means, the demodulation clock being synchronized with each of the reproduction target pulses with the predetermined width by the synchronizing means.

According to another aspect of the present invention, there is provided a digital signal reproducing apparatus comprising:

fundamental period calculating means for calculating a fundamental period in accordance with a plurality of pulses including a reproduction target pulse included in binary reproduced output signal pulses sequentially input as digital signal pulses to be reproduced;

clock generating means for generating a demodulation clock having the fundamental period calculated by the fundamental period calculating means;

phase error amount detecting means for detecting a phase error amount in accordance with a phase difference between the demodulation clock generated by the clock generating means and a plurality of pulses including the reproduction target pulse;

synchronizing means for controlling the phase error amount of a generation timing of the demodulation clock from the clock generating means to a predetermined value in accordance with the phase error amount detected by the phase error amount detecting means so that the demodulation clock generated by the clock generating means is synchronized with each of the reproduction target pulses; and demodulating means for sequentially demodulating the binary reproduced output signal pulses in accordance with the demodulation clock from the clock generating means, the demodulation clock being synchronized with each of the reproduction target pulses with the predetermined phase error amount by the synchronizing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a diagram showing the principle of the first embodiment according to the present invention;

FIG. 6 is a block diagram showing an arrangement of a synchronizing circuit shown in FIG. 2;

FIG. 9 is a block diagram showing the principle of a digital signal reproducing apparatus according to the second embodiment of the present invention;

FIGS. 12A to 12I are timing charts for explaining a synchronization state according to the second embodiment of the present invention.

DETAILED DESCRIPTION OF THE PREFERRED EMBODIMENTS

Figure 2:
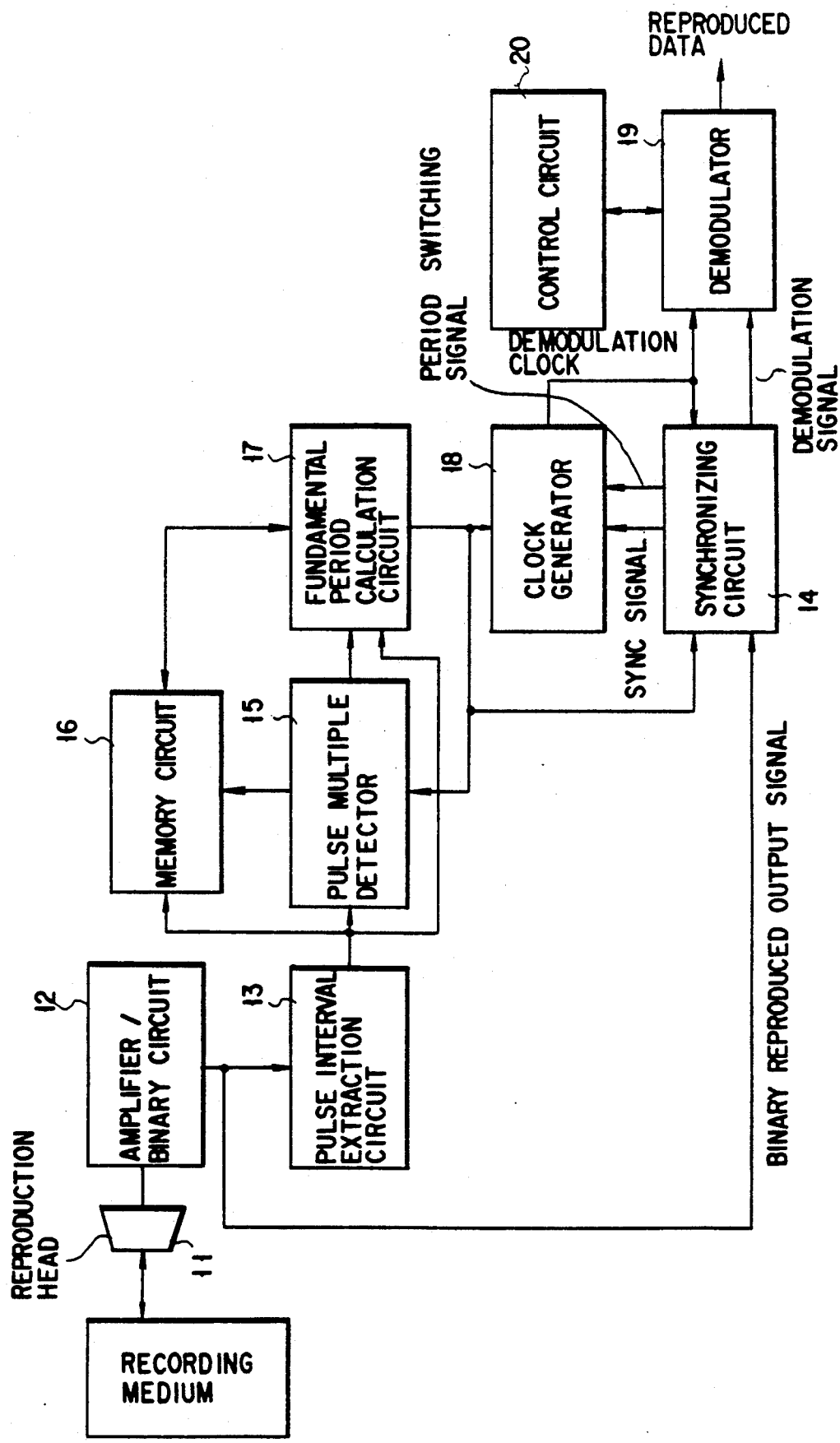
FIG. 2 is a block diagram showing an arrangement of the first embodiment of the present invention.
Figure 3:
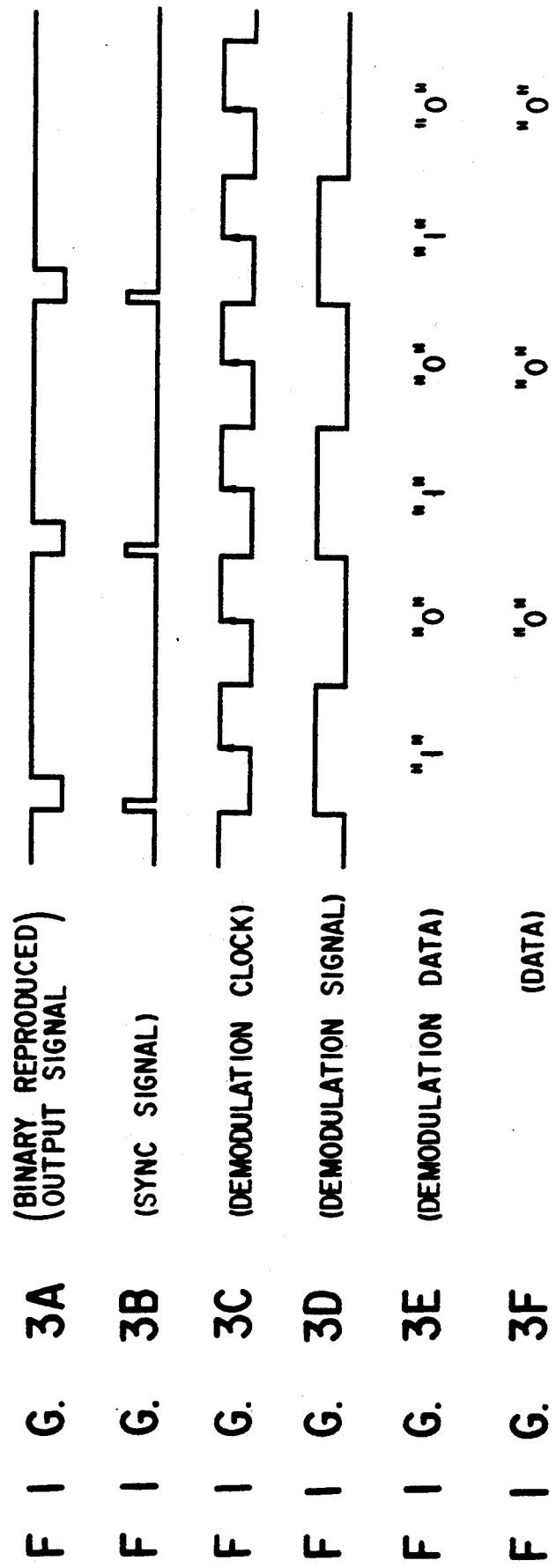
FIGS. 3A to 3F are timing charts of signals for explaining the operations of the respective parts shown in FIG. 2.

Reference will now be made in detail to the presently preferred embodiments of the invention as illustrated in the accompanying drawings, in which like reference characters designate like or corresponding parts throughout the several drawings.

FIG. 1 is a diagram showing the principle of a digital signal reproducing apparatus according to the first embodiment of the present invention. A binary reproduced output signal input through a reproduction head (not shown) and a binary circuit (not shown) is supplied to a pulse interval extraction section 1 and a synchronizing section 2. The pulse interval extraction section 1 sequentially measures pulse interval values of a pulse train in the binary reproduced output signal (to be also referred to as briefly a reproduced output pulse hereinafter) and supplies the measured values to a pulse multiple detecting section 3. The pulse multiple detecting section 3 detects a multiple of a fundamental period T value to which each pulse interval value from the pulse interval extraction section 1 corresponds, and supplies the detected multiple value to a fundamental period calculation section 4. The fundamental period calculation section 4 calculates a new fundamental period T' on the basis of pulse interval values corresponding to several pulses and multiple values corresponding to the respective fundamental period T values. The fundamental period T' value is supplied to a clock generating section 5. At the same time, the fundamental period T' value is also supplied as a fundamental period value for detecting the next pulse multiple value to the pulse multiple detecting section 3. The fundamental period T' value is calculated such that a sum of the pulse interval values, e.g., corresponding to several pulses is divided by a sum of pulse multiple values. The fundamental period T' value varies depending on relative speed variations between the reproduction head and the recording medium. However, when the fundamental period T' value is calculated using several pulses, variation components included in one-shot pulses can be canceled.

The clock generating section 5 generates and outputs a demodulation clock for demodulating a reproduced output pulse train on the basis of the fundamental period T' value from the fundamental period calculation section 4 and the predetermined sync signal from the synchronizing section 2. At the same time, the clock generating section 5 supplies the demodulation clock and the period T' value to the synchronizing section 2.

On the other hand, the synchronizing section 2 obtains a predetermined sync signal on the basis of the binary reproduced output pulse and the demodulation clock from the clock generating section 5 and supplies the predetermined sync signal to the clock generating section 5. The clock generating section 5 synchronizes the demodulation clock with the reproduced output pulse with a predetermined width.

As described above, the fundamental period T' value is calculated using several reproduced output pulses, and the demodulation clock is generated using the fundamental period T' value. At the same time, the demodulation clock is synchronized with each reproduced output pulse with a predetermined width. Therefore, a demodulation clock which can gradually trace a relative speed variation between the reproduction head and the recording medium and is free from a one-shot reproduced signal fluctuation caused by damage and dust on the recording medium can be obtained. The reproduced signal can be always demodulated with high accuracy.

FIG. 2 is a block diagram showing an arrangement of the first embodiment on the basis of the principle described above. A reproduced signal from a reproduction head 11 such as a magnetic or optical head for reading a signal from a recording medium is shaped by an amplifier/binary circuit 12. The amplifier/binary circuit 12 supplies the shaped signal as a binary reproduced output signal consisting of a pulse train to a pulse interval extraction circuit 13 and a synchronizing circuit 14.

The pulse interval extraction circuit 13 causes a counter to sequentially count pulse interval values of a binary reproduced output signal and supplies a count value p to a pulse multiple detector 15, a memory circuit 16, and a fundamental period calculation circuit 17.

The pulse multiple detector 15 divides the measured pulse interval value p by a period T value of the clock currently output from a clock generator (to be described in detail later) to obtain a multiple value n representing that the pulse interval value p corresponds to a specific multiple of the period T value. The multiple value n is supplied to the memory circuit 16 and the fundamental period calculation circuit 17.

The fundamental period calculation circuit 17 divides a sum of a predetermined number of sequential pulse interval values p by a sum of the multiple values n on the basis of the pulse interval value p and the multiple value n respectively supplied from the pulse interval extraction circuit 13 and the pulse multiple detector 15, and a plurality of previous pulse interval values p and a plurality of previous multiple values n which are already stored in the memory circuit 16, thereby calculating a new average period T' value. This new average T' value is supplied to a clock generator 18 and the synchronizing circuit 14. This value is also supplied as a fundamental period value to the pulse multiple detector 15 to detect the next pulse multiple value. As described above, the new average period T' value is calculated on the basis of the sum of the plurality of sequential pulse interval values p and the sum of the multiple values n, thereby obtaining an average period T' value which cancels individual pulse jitter components.

The clock generator 18 generates a demodulation clock for demodulating the reproduced output pulse train on the basis of the average period T' value from the fundamental period calculation circuit 17 and the predetermined sync signal and a period switching signal from the synchronizing circuit 14. This demodulation clock is supplied to the synchronizing circuit 14 and a demodulator 19.

The synchronizing circuit 14 calculates a predetermined sync signal on the basis of the binary reproduced output pulses, the demodulation clock from the clock generator 18, and the period T' value from the fundamental period calculation circuit 17. The predetermined sync signal is supplied to the clock generator 18 to obtain a demodulation signal on the basis of the input demodulation clock so that the demodulation clock is synchronized with the reproduced output pulse with a predetermined width. The demodulation signal is supplied to the demodulator 19. The sync signal is normally generated upon reception of the binary reproduced output signal. The clock generator 18 re-synchronizes the demodulation clock every time a binary reproduced output signal pulse is received. Re-synchronization is performed in accordance with the reception timing of the reproduced output signal pulse. That is, the generation timing of a sync signal is shifted or a sync signal is not generated for a pulse having a large jitter component. In this manner, the demodulation clock is synchronized with the reproduced output signal pulse with a predetermined width.

The demodulator 19 samples the demodulation signal using the demodulation clock in accordance with a demodulation start command or a demodulation end command from a control circuit 20, thereby demodulating "0" and "1" digital data.

FIGS. 3A to 3F are timing charts showing signals associated with digital data demodulation described above. More specifically, a trailing edge of a binary reproduced output signal pulse is detected to obtain a sync signal. A demodulation clock is generated using this sync signal and a fundamental period from the fundamental period calculation circuit. Data is then extracted from demodulation data based on the demodulation signal obtained from the sync signal and the demodulation clock. For example, in MFM modulation, data can be obtained by eliminating a clock bit from the demodulation data.

The detailed arrangements of the respective components of the digital signal reproducing apparatus shown in FIG. 2 will be described below.

Figure 4:
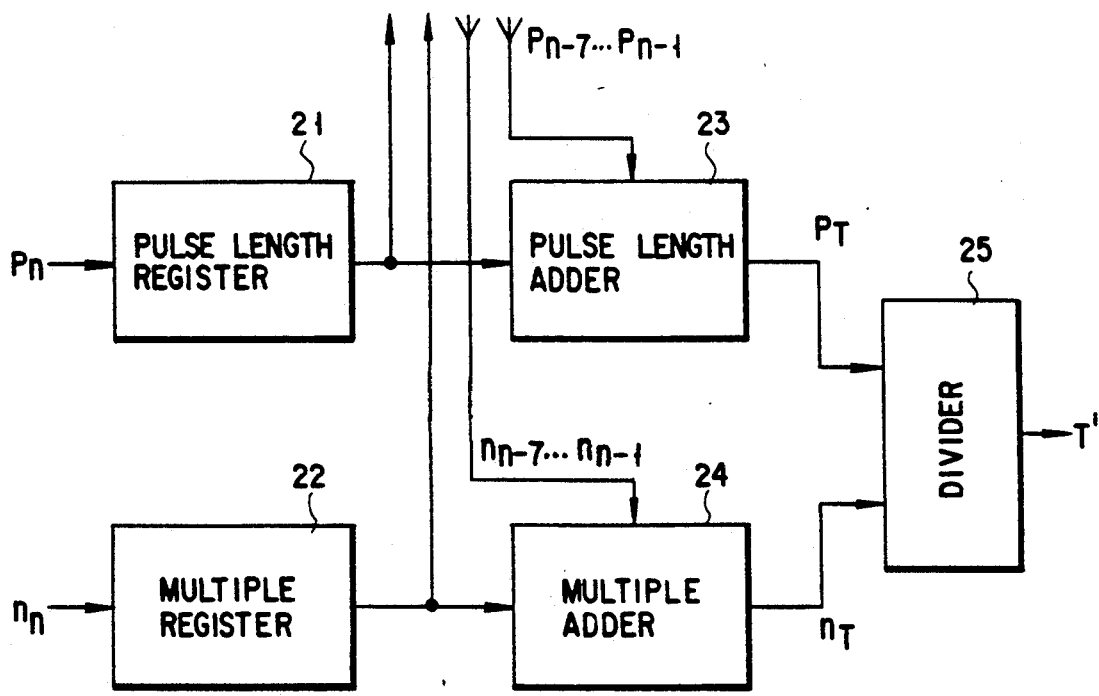
FIG. 4 is a block diagram showing an arrangement of a fundamental period calculation circuit shown in FIG. 2.

FIG. 4 shows an arrangement of the fundamental period calculation circuit 17. The fundamental period calculation circuit 17 comprises a pulse length register 21, a multiple register 22, a pulse length adder 23, a multiple adder 24, and a divider 25. The pulse length register 21 comprises, e.g., an up counter and latches a pulse interval value p from the pulse interval extraction circuit 13. The multiple register 22 comprises, e.g., a down counter and latches the multiple value n from the pulse multiple detector 15.

The pulse length register 21 supplies the latched pulse interval value p to the memory circuit 16 and the pulse length adder 23. Similarly, the multiple register 22 supplies the latched multiple value n to the memory circuit 16 and the multiple adder 24.

The pulse length adder 23 adds the pulse interval value $p_n$ from the pulse length register 21 and seven immediately preceding pulse interval values $p_{n-1}$ to $p_{n-7}$ stored in the memory circuit 16 to obtain a sum $p_T$. The sum $p_T$ is supplied to the divider 25. Similarly, the multiple adder 24 adds the multiple value $n_n$ from the multiple register 22 and seven immediately preceding multiple values $n_{n-1}$ to $n_{n-7}$ stored in the memory circuit 16 to obtain a sum $n_T$. The sum $n_T$ is supplied to the divider 25.

The divider 25 performs a calculation $p_T/n_T$ on the basis of the sum $p_T$ of the pulse interval values from the pulse length adder 23 and the sum $n_T$ of the multiple values from the multiple adder 24 to obtain a new fundamental period T' value. This value is supplied to the synchronizing circuit 14 and the clock generator 18. This value is fed back to the pulse multiple detector 15 and is used as a fundamental period for detecting the next pulse multiple value.

As described above, the new fundamental period T' value calculated by the fundamental period calculation circuit 17 is fed back to the pulse multiple detector 15 and is used as the fundamental period for detecting the next pulse multiple value. Therefore, the period can trace large variations of the binary reproduced output signal in pulse width.

Figure 5:
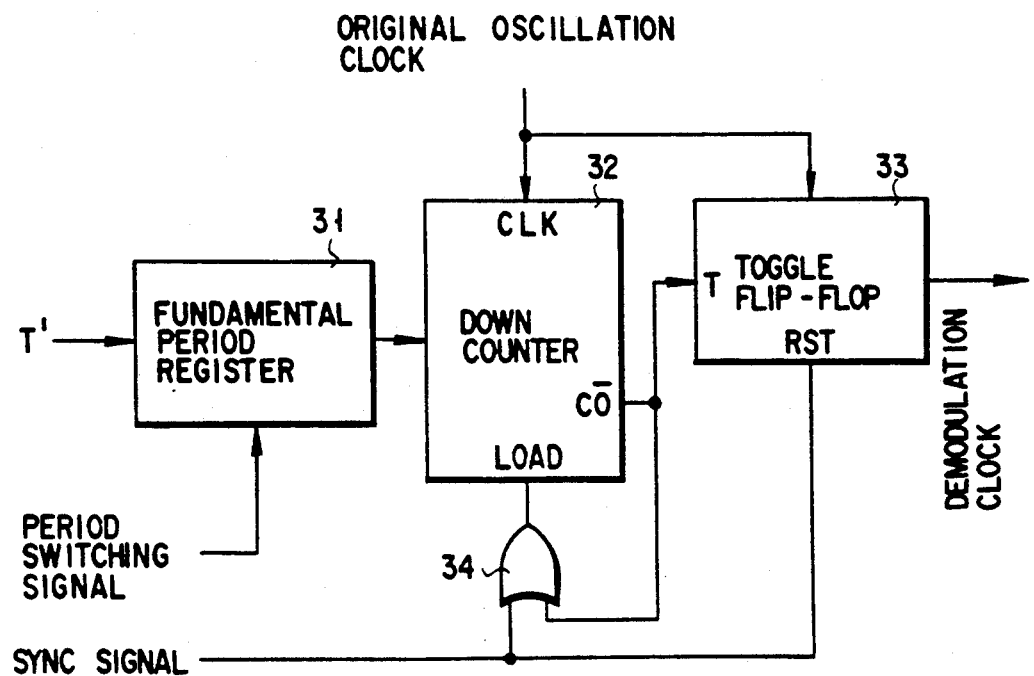
FIG. 5 is a block diagram showing an arrangement of a clock generator shown in FIG. 2.

FIG. 5 shows an arrangement of the clock generator 18. This clock generator 18 comprises a fundamental period register 31, a down counter 32, a toggle flip-flop 33, and an OR gate 34. The fundamental period T' value from the fundamental period calculation circuit 17 is supplied to and latched by the fundamental period register 31. When a period switching signal is not supplied from the synchronizing circuit 14 to the fundamental period register 31, the fundamental period register 31 supplies a ½ value of the latched fundamental period T' value to the down counter 32. However, when the period switching signal is supplied to the fundamental period register 31, it supplies a ¼ value of the latched fundamental period T' value to the down counter 32.

A sync signal from the synchronizing circuit 14 is supplied to a load terminal LOAD of the down counter 32 through the OR gate 34. The down counter 32 loads an output from the fundamental period register 31 on the basis of this sync signal and then starts a count-down operation in response to an original oscillation clock. When counting of the down counter 32 is completed, a carry signal (CO) is generated and supplied to a terminal T of the toggle flip-flop 33 and to the load terminal LOAD of the down counter 32 through the OR gate 34. An output from the toggle flip-flop 33 is inverted and at the same time, an output from the fundamental period register 31 is loaded again to start the down counter 32.

A sync signal from the synchronizing circuit 14 is supplied to a reset terminal RST of the toggle flip-flop 33, thereby resetting the toggle flip-flop 33. More specifically, when the sync signal is input to the reset terminal RST of the toggle flip-flop 33, a demodulation clock pulse output therefrom forcibly goes low, thereby establishing synchronization.

Every time a count-down operation is completed, an output from the toggle flip-flop 33 is inverted to obtain a demodulation clock. At the same time, this demodulation clock is synchronized with the binary reproduced output signal with a predetermined width by means of the sync signal output from the synchronizing circuit 14.

As described above, by generating the demodulation clock by the sync signal, the reproduced output signal can be synchronized with the demodulation clock by the first sync signal. Therefore, the binary reproduced output signal can be immediately phase-locked.

FIG. 6 is a block diagram showing an arrangement of the synchronizing circuit 14, and FIGS. 7A to 7H are timing charts showing signals from the respective components so as to explain operations thereof. This synchronizing circuit 14 comprises an inversion detector 41, a down counter 42, a fundamental period register 43, a trailing edge detector 44, AND gates 45 to 48, inverters 49 and 50, a delay circuit 51, and an OR gate 52. The demodulation clock from the clock generator 18 is supplied to the inversion detector 41 and the AND gates 45 and 46 and to the AND gates 47 and 48 through the inverter 49. The fundamental period T' value from the fundamental period calculation circuit 17 is supplied to and latched by the fundamental period register 43. The fundamental period register 43 supplies a 1/4 value of the latched fundamental period T' value to the down counter 42. The binary reproduced output signal from the amplifier/binary circuit 12 is supplied to the trailing edge detector 44, thereby obtaining a sync pulse synchronized with this trailing edge. The sync pulse is supplied to the AND gates 45 to 48.

The inversion detector 41 detects leading and trailing edges of the demodulation clock to obtain a load pulse. The load pulse is supplied to the down counter 42. The down counter 42 loads a ¼ value of the latched fundamental period T' value from the fundamental period register 43 in response to this load pulse to start a count-down operation. When counting of the down counter 42 is ended, a carry signal (CO) is generated and is supplied to an enable terminal of the down counter 42, the AND gates 45 and 47, and the delay circuit 51. At the same time, the carry signal is supplied to the AND gates 46 and 48 through the inverter 50.

The OR gate 52 receives outputs from the AND gates 45, 47, and 48 and an output from the AND gate 46 through the delay circuit 51. An output from the OR gate 52 is supplied as the sync signal to the clock generator 18. At the same time, an output from the AND gate 47 is supplied as the period switching signal to the clock generator 18.

If no variation factor is included in a binary reproduced output signal and a constant pulse interval is obtained, the trailing edge of the binary reproduced output signal coincides with the trailing edge of the demodulation clock. In this embodiment, if a relative speed variation between the reproduction head 11 and the recording medium and a binary reproduced output signal fluctuation caused by damage and dust on the recording medium are taken into consideration so that if the trailing edge of the binary reproduced output signal is located within ±25% of the trailing edge of the demodulation clock, the binary reproduced output signal is synchronized with the demodulation clock as a normal interval.

Figure 7:
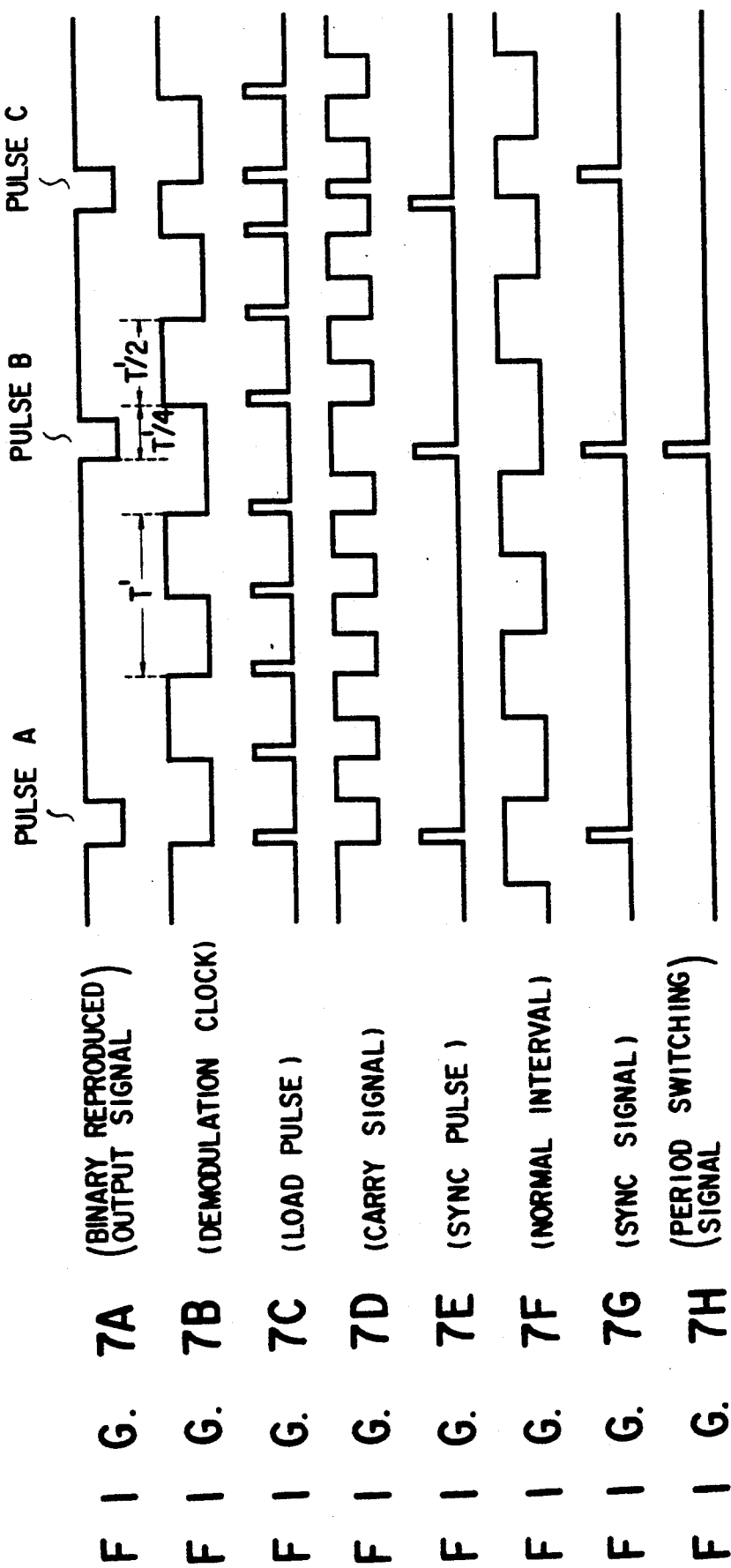
FIGS. 7A to 7H are timing charts showing signals for explaining the above components.

More specifically, when a sync pulse is present within a normal interval as in a pulse A in FIG. 7A, a sync signal obtained upon reception of the binary reproduced output signal is supplied as a sync signal to the clock generator 18 by the AND gates 45 and 48. To the contrary, when a sync pulse is delayed from a normal interval as in a pulse B in FIG. 7A, the sync pulse is output from the AND gate 47 as a sync signal and a period switching signal These signals are supplied to the clock generator 18. The clock generator 18 then supplies a ¼ value of the latched fundamental period T' value from the fundamental period register 31 to the down counter 32. In this manner, the inversion period of the first demodulation clock is advanced, and a demodulation clock equivalent to that obtained when the pulse B is input without any delay can be obtained. When a sync pulse is advanced from the normal interval as in a pulse C in FIG. 7A, a sync pulse is output from the AND gate 46. This pulse is delayed by a T'/4 period by means of the delay circuit 51, thereby outputting the delayed pulse as a sync signal.

As described above, according to this embodiment, pulse intervals of the actual reproduced output signal pulses are averaged to obtain the period of the demodulation clock. Therefore, the jitter components of the individual pulses can be canceled with each other. Although the binary reproduced output signal pulse is normally phase-locked with the demodulation clock, the phase is selectively shifted for a signal having a large jitter component. The binary reproduced output signal is phase-locked with the demodulation clock with a predetermined width. Therefore, a demodulation clock which always traces a correct signal can be obtained without causing an error of phase lock with an erroneous signal caused by damage and dust on the recording medium.

The present invention is not limited to the first embodiment described above, and various changes and modifications may be made within the spirit and scope of the invention. In the first embodiment, the delay amount of a pulse falling outside the normal interval is adjusted to establish synchronization. However, the AND gates 46 and 47 and the delay circuit 51 in FIG. 6 may be omitted, and synchronization of a pulse falling outside the normal interval may not be performed.

Figure 8:
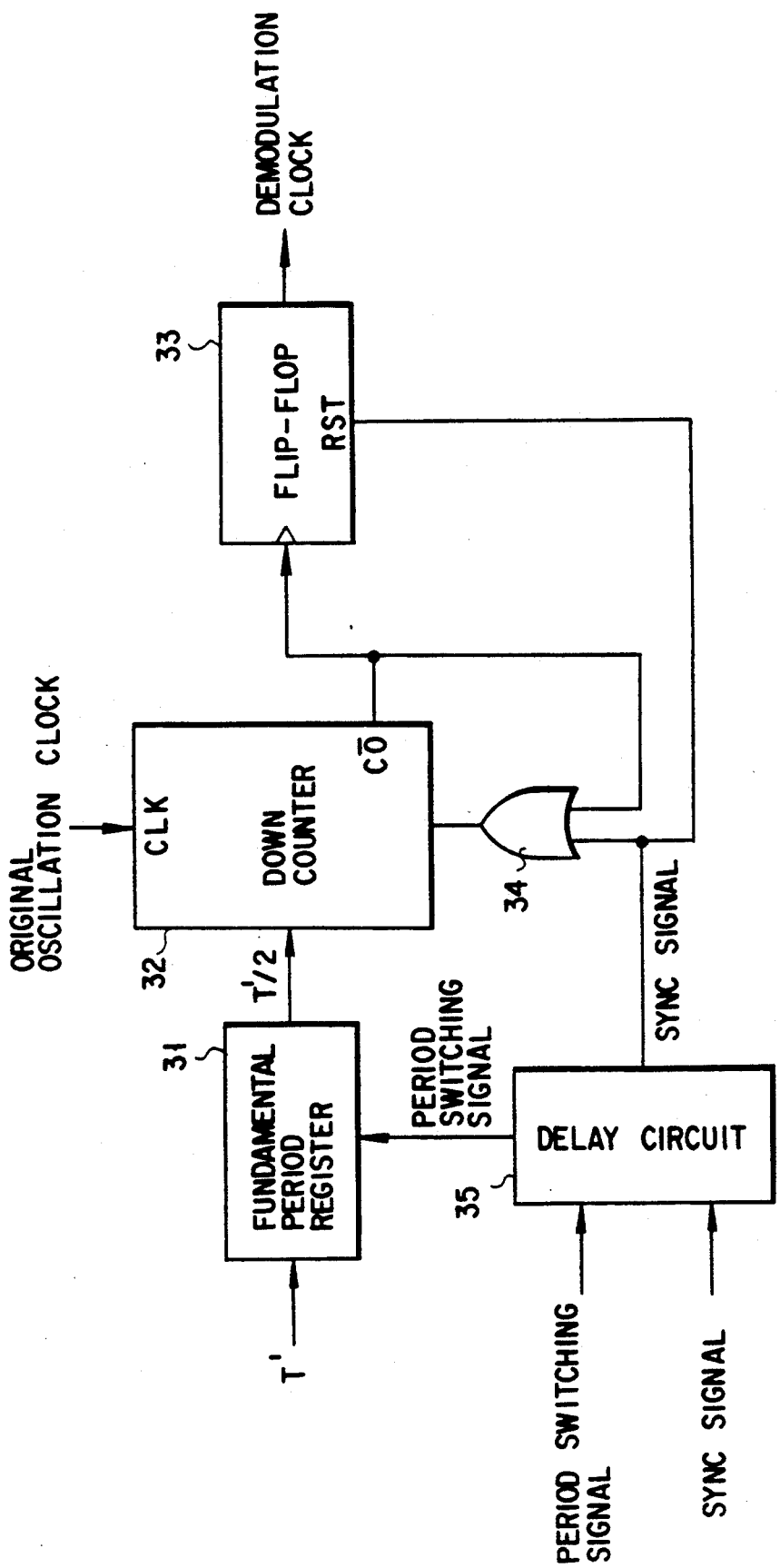
FIG. 8 is a block diagram showing another arrangement of a clock generator according to the present invention.

In the first embodiment, the fundamental period T' value of the pulse $p_n$ is obtained by an average value of the pulses $p_{n-7}$ to $p_{n-1}$ of the binary reproduced output signal. However, a period T" value of a pulse $p_{n-4}$ may be obtained by an average value of the pulses $p_{n-7}$ to $p_{n-1}$. In this case, a delay circuit 35 shown in FIG. 8 is arranged in the clock generator 18. A sync signal and a period switching signal from the sync circuit 14 may be delayed by a time corresponding to four binary reproduced output signal pulses, and a pulse sync signal of the pulse $p_{n-4}$ may be generated during calculation of the pulses $p_{n-7}$ to $p_{n-1}$. When the fundamental period of the demodulation clock is calculated by a predicative average value, a more accurate fundamental period can be obtained. At the same time, since the pulse width generally continuously varies except for jitter components, variations of the reproduced output signal in pulse width caused by relative speed variations between the reproduction head and the recording medium can be easily traced.

In the first embodiment described above, when a binary reproduced output signal is input in an interval falling outside the normal interval, T'/4 phase compensation is performed to advance or delay the demodulation clock by T'/4. However, the fundamental period register 43 and the register in the delay circuit 51 in FIG. 6 may be programmed by an external CPU or the like. The phase correction amount may be arbitrarily set to be T'/3, T'/5, or the like. In this manner, accurate phase correction suitable for the characteristics of a binary reproduced output signal can be performed. A demodulation signal capable of accurately demodulating a binary reproduced output signal having a large variation amount can be generated.

In the first embodiment, a fundamental period is calculated by an averaging method. However, a fundamental period may be calculated by a method of predicting a variation of a binary reproduced output signal in pulse width, e.g., an algorithm such as a square averaging method.

According to the first embodiment of the present invention, a fundamental period is calculated on the basis of a plurality of predetermined sequentially reproduced output pulses to generate a demodulation clock corresponding to this fundamental period. At the same time, the demodulation clock is phase-locked with the reproduced output pulse with a predetermined width. A demodulation clock can effectively trace variations in reproduced output pulse width caused by the relative speed variations between the recording medium and the reproduction head. At the same time, this demodulation clock has a minimum influence of variations and omissions in reproduced output pulse width caused by damage and dust on the recording medium. Therefore, data modulated and recorded by an arbitrary self-clock scheme can always be demodulated with high accuracy. In addition, since the demodulation clock can be immediately phase-locked with the reproduced output pulse, a phase-lock pattern formed on the recording medium can be minimized. Therefore, the data storage capacity of the recording medium can be increased.

The second embodiment which is obtained by further developing a technical concept of the digital signal reproducing apparatus of the first embodiment will be described below.

The digital signal reproducing apparatus of the first embodiment has an advantage in that a phase of a demodulation clock can be determined to perform demodulation from a phase difference between one pulse and the demodulation clock upon reception of this clock. However, variations in demodulation clock phase upon reception of each pulse may directly adversely affect the demodulation clock. If the pulse position is abruptly changed, a demodulation error may occur. For example, if the pulse position is largely shifted behind the normal position and the next pulse is largely advanced, the clock bit is shifted from the data bit. This may cause inaccurate demodulation.

A digital signal reproducing apparatus according to the second embodiment can perfectly eliminate a possibility of such a demodulation error of the first embodiment.

The principle of the second embodiment will be described with reference to a functional block diagram.

Each pulse interval value is measured by a pulse interval extraction section 101 for extracting pulse interval values of a pulse train of a binary reproduced output signal input through a reproduction head (not shown) and a binary circuit (not shown). A pulse multiple detecting section 102 detects a multiple of a predetermined fundamental period T value to which each measured pulse interval value corresponds. A fundamental period calculation section 103 calculates a new fundamental period T' value on the basis of pulse interval values corresponding to several pulses and multiple values of the fundamental period T values corresponding to the pulse interval values. The period calculation section 103 calculates the new fundamental period T' value by dividing a sum of, e.g., pulse interval values of several pulses by a sum of corresponding pulse multiple values. A clock generating section 104 generates a demodulation clock using this period T' value. The demodulation clock is synchronized with the original binary reproduced output signal by a synchronizing section 105 and is output.

A phase difference extraction section 106 detects a phase difference between the binary reproduced output signal and the generated demodulation clock. A phase error amount calculation section 107 accumulates the detected phase differences of several pulses and calculates a phase difference between the reproduced output signal and the generated clock. The synchronizing section 105 adds the calculated error amount to the binary reproduced output signal to generate a sync signal.

The second embodiment based on the above principle according to the present invention will be described below.

Figure 10:
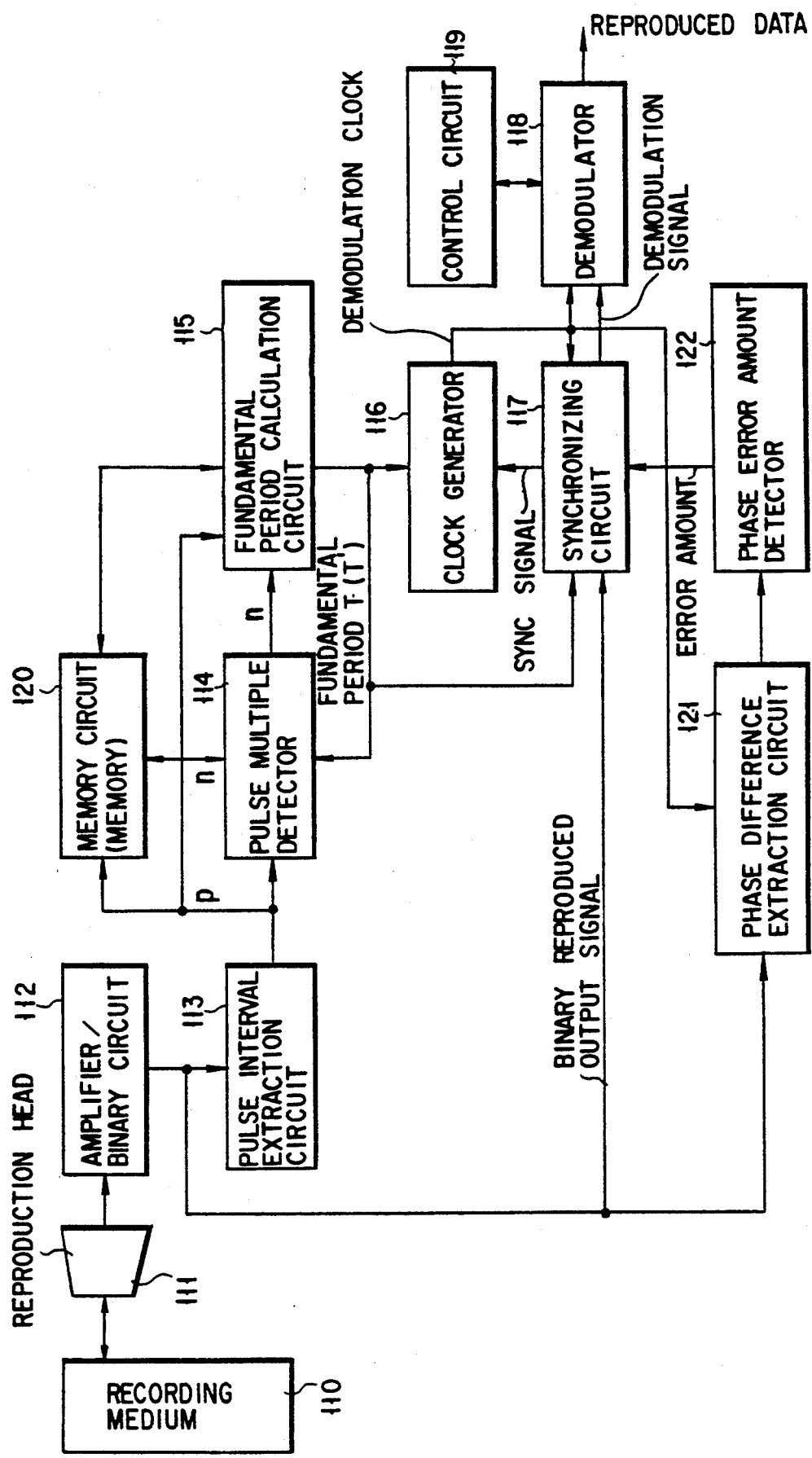
FIG. 10 is a block diagram showing the overall arrangement of a digital signal reproducing apparatus according to the second embodiment of the present invention.

FIG. 10 is a block diagram showing the overall arrangement of a digital signal reproducing apparatus according to the second embodiment of the present invention. Reference numeral 111 denotes a reproduction head such as a magnetic or optical head for reading a signal on a recording medium 110. A reproduced signal such as an analog signal read from the recording medium is shaped by an amplifier/binary circuit 112. An output from the amplifier/binary circuit 112 is input to a pulse interval extraction circuit 113 as a binary reproduced output signal consisting of a pulse train. At the same time, the output from the amplifier/binary circuit 112 is also supplied to a synchronizing circuit 117 and a phase difference extraction circuit 121. The pulse interval extraction circuit 113 causes a clock counter to count pulse interval values p of each reproduced output signal at a counting frequency higher than that of the reproduced output signal. The counted pulse interval values p are sequentially input to a pulse multiple detector 114 and a fundamental period calculation circuit 115. At the same time, the pulse interval values p are stored in a memory circuit (memory) 120. The pulse multiple detector 114 divides the counted pulse interval value p by a current fundamental period T value (this is equal to the current demodulation clock period T value generated by a clock generator 116 to be described later) from the fundamental period calculation circuit 115 to determine a specific multiple n (=P/T) of the period T value to which the pulse period corresponds. The multiple values n output from the pulse multiple detector 114 are sequentially supplied to the fundamental period calculation circuit 115 and are sequentially stored in the memory circuit 120.

The fundamental period calculation circuit 115 calculates a new average period T' value (dp/dn) from a sum dp and a sum dn of a current pulse and a plurality of predetermined i multiple values of pulses including a plurality of previous pulses and stored in the memory circuit 120. That is, $T' = (P_1 + P_2 + \ldots + P_i)/(n_1 + n_2 + \ldots + n_i)$. In the manner, the sums of several pulses are averaged to cancel pulse jitter components This indicates that the period T' value which can gradually trace relative speed variations between the reproduction head 111 and the recording medium 110 and is not adversely affected by a reproduced signal fluctuation caused by damage and dust on the recording medium 110 can be obtained.

The calculated average period T' value is sent to the clock generator 116 and is used to cause the clock generator 116 to generate a demodulation pulse having the period T' value. At the same time, the calculated average period T' value is fed back to the pulse multiple detector 114 and is used as a new fundamental period T' value for calculating a pulse multiple value. The average period T' value is also input to a synchronizing circuit 117 and is used to phase-lock the demodulation clock.

The synchronizing circuit 117 sends a sync signal obtained upon detection of a trailing edge of the binary reproduced output signal to the clock generator 116 so as to phase-lock the demodulation clock with the binary reproduced output signal. At the same time, the synchronizing circuit 117 sends the sync signal and a demodulation signal derived from the sync signal and the demodulation clock to a demodulator 118. This sync signal is generated upon reception of the binary reproduced output signal when the phase difference extraction circuit 121 and a phase error amount detector 122 detect no phase error. The clock generator 116 re-synchronizes the demodulation clock upon reception of each pulse. When the input position of the binary reproduced output signal pulse falls outside the predetermined position range calculated using the input positions of the previous pulses (in this embodiment, the range is ±25% of the period T value from a predicted trailing edge of the demodulation clock), i.e., when a pulse has a large jitter component, the sync signal is not output from the synchronizing circuit 117.

For this reason, demodulation clocks are not synchronized or phase-locked again, and the immediately preceding demodulation clock is continuously output.

The phase difference extraction circuit 121 extracts a phase difference between the reproduced signal pulse and the demodulation clock pulse from the clock generator 116. The phase error amount detector 122 detects a phase difference between the reproduced signal and the generated clock as an average value on the basis of the phase differences of the previous pulses stored in the phase difference extraction circuit 121 and sends a correct sync timing to the synchronizing circuit 117.

As described above, since no synchronization is performed for a pulse having a large jitter component, correct demodulation can be performed without disturbing the demodulation clock. The demodulator 118 samples the demodulation signal using the demodulation clock in accordance with a demodulation start command or a demodulation end command from a control circuit 119, thereby demodulating "0" and "1" digital data.

The waveforms of timing signals associated with demodulation of this digital data are substantially the same as those of the first embodiment shown in FIGS. 3A to 3F.

Detailed arrangements of the respective components of the digital signal reproducing apparatus according to the second embodiment shown in FIG. 10 will be described below.

The fundamental period calculation circuit 115 and the clock generator 116 may be arranged as those of the first embodiment shown in FIGS. 4 and 5, respectively.

Figure 11:
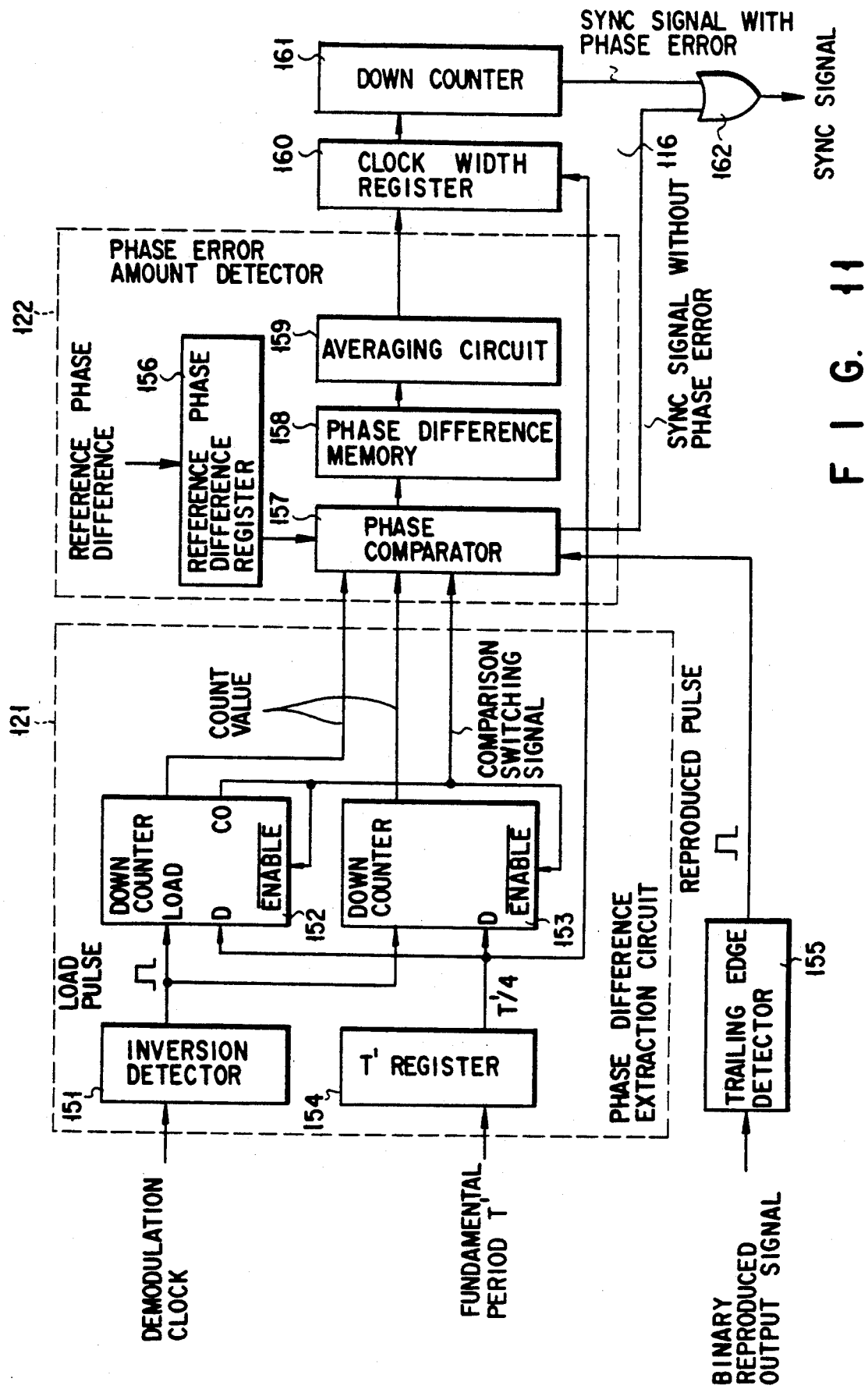
FIG. 11 is a block diagram showing a detailed arrangement of a synchronizing circuit, a phase difference extraction circuit, and a phase error amount detector according to the second embodiment of the present invention.

FIG. 11 shows an arrangement of the synchronizing circuit 117, the phase difference extraction circuit 121, and the phase error amount detector 122. FIGS. 12A to 12I are timing charts for explaining a synchronization state in the arrangement of FIG. 11. The synchronizing circuit 117 generates a sync signal for synchronizing or phase-locking the binary reproduced output signal with the demodulation clock. The leading and trailing edges of the demodulation clock generated by the clock generator 116 are detected by an inversion detector 151 to obtain a load pulse. The load pulse is output to down counters 152 and 153. The down counter 152 loads a ¼ value of the fundamental period T' value from a fundamental period register 154 in response to this load pulse and starts a count-down operation. The down counter 153 is started upon completion of the down counter 152. A normal interval (−25% to +25%) in which a binary reproduced output signal is input is obtained (FIGS. 12A to 12F) on the basis of a carry output CO from the down counter 152 and the demodulation clock.

Operations of the synchronizing circuit 117, the phase difference extraction circuit 121, and the phase error amount detector 122 will be described with reference to FIG. 11.

The down counter 152 receives a load pulse (FIG. 12D) generated at the leading or trailing edge of a demodulation clock (FIG. 12B) input to the inversion detector 151. The load pulse is generated at the leading edge of the demodulation clock and is input to the LOAD terminal of the down counter 152. A ¼ value of the fundamental period T' value is input and set as an initial value from a T' register 154 to the D terminal of the down counter 152. The down counter 152 starts its count-down operation. Count values during this count-down operation are sequentially input to a phase comparator 157. The phase comparator 157 receives a 25% value of the fundamental period T' value from a reference phase difference register 156 and a reproduced pulse from a trailing edge detector 155 for detecting the trailing edge of the binary reproduced output signal. These three inputs (i.e., the count value from the down counter, the 25% value of the fundamental period T' value, and the presence/absence of the reproduced output pulse) are compared by the phase comparator 157 as follows.

When the count value of the down counter 152 is smaller than the 25% value of the fundamental period T' value and a reproduced output pulse is input, a phase difference between the demodulation clock and the binary reproduced output signal is determined to fall within ±25% of the fundamental period. The phase comparator 157 outputs the reproduced output pulse as a sync signal free from a phase error. At the same time, data of "0" representing that no phase error is present is output to a phase difference memory 158.

On the other hand, when the down count value is equal to or larger than the 25% value of the fundamental period T' value and a reproduced output pulse is input, a phase difference between the demodulation clock and the binary reproduced output signal falls outside the ±25% range of the fundamental period. In order to perform the following phase difference correction, a down count value upon reception of the reproduced output pulse is stored as a phase difference in the phase difference memory 158.

The count-down operation of the down counter 152 continues, a carry signal CO is output to the down counter 153, and the down counter 153 is set in an operative state. A T'/4 portion of the next half cycle is initially set at the D terminal of the down counter 153 in response to a load pulse generated by the trailing edge of the demodulation pulse from the inversion detector 151, thereby starting the count-down operation of the down counter 153. Count values from the down counter 153 are sequentially input to the phase comparator 157. Three input values are compared to determine whether a phase difference is present in the same manner as described above. In this case, however, it is checked if the phase difference from the trailing edge of the demodulation clock in the down counter 153 falls within the ±25% range. If the carry signal CO from the down counter 152 falls within the ±25% range (normal interval), the absence of a phase difference error is determined. However, if the carry signal CO falls outside the ±25% range (normal interval), the presence of a phase difference is determined.

If the presence of a phase difference error is determined, phase correction is performed by adding to the fundamental period T' value ±(average phase difference) obtained by dividing a cumulative phase difference by a cumulative pulse count.

A technique for performing phase correction if a phase difference between a binary reproduced output signal and a demodulation clock falls outside the ±25% range (i.e., outside the normal interval) will be described below. The value (the 25% value of the fundamental period T' value) set in reference phase difference register 156 is compared with count values sequentially output from the down counter 152 upon reception of reproduced output pulses from the trailing edge detector 155. If the count value is larger than the set value, the count value (corresponding to the phase difference) is stored in the phase difference memory 158. An average value of phase differences of the previous pulses is calculated by an averaging circuit 159 using this cumulative phase difference.

Extreme phase errors of one-shot pulses can be averaged by the above averaging operation. Gradual phase errors can also be smoothly traced. A clock width register 160 adds the average phase difference (positive or negative) to the ¼ value (T'/4) of the fundamental period T' value from the T' register 154 to form a new fundamental period whose phase difference is corrected. A down counter 161 generates a corrected phase timing signal and outputs a sync signal to an OR gate 162 when a phase error is present.

Signal states based on the arrangement of FIG. 11 will be described with reference to FIGS. 12A to 12I. The trailing edge detector 155 sends a reproduced output pulse in response to a trailing edge of a binary reproduced output signal. If no variation factor is present in the binary reproduced output signal and the pulse interval is kept constant, the trailing edge of the binary reproduced output signal must coincide with that of the demodulation clock (corresponding to a pulse A in FIG. 12A). Even if relative speed variations between the reproduction head 111 and the recording medium 110 and a binary reproduced output signal fluctuation are taken into consideration, the demodulation clock is phase-locked with each binary reproduced output signal having a phase error amount of ±25% with respect to the trailing edge of the demodulation clock. More specifically, a 25% value of the fundamental period T' value is set in the reference phase difference register 156. A reproduced output pulse (FIG. 12G) is output from the trailing edge detector 155 upon reception of the binary reproduced output signal. If this pulse is compared with the count values from the down counters 152 and 153 and a variation in demodulation clock falls within the ±25% range (i.e., within the normal interval), the reproduced output pulse directly serves as a sync signal and is output through the OR gate 162. At the same time, a phase difference "0" is recorded in the phase difference memory 158 (i.e., the phase difference becomes zero because phase locking is performed). An output pulse from the OR gate 162 is the pulse A in FIG. 12A. The reproduced pulse upon reception of the binary reproduced output signal directly serves as a sync signal. This signal is output as a sync signal (FIG. 12I) free from a phase error.

When a binary reproduced output signal is delayed to fall outside this range (i.e., a pulse B in FIG. 12A), the averaging circuit 159 averages phase differences of the previous pulses from the phase difference memory 158. A correction component (i.e., a phase shift) is added to the clock width of the average value to generate a sync signal. This sync signal corresponds to the pulse B in FIG. 12A. Therefore, a sync signal shown in FIG. 12H is output. A demodulation clock is generated on the basis of this sync signal. A signal (FIG. 12C) shown below the demodulation signal in FIG. 12B is a non-phase-locked demodulation clock.

When a binary reproduced output signal is input early to fall outside the normal interval (i.e., a pulse C in FIG. 12A, a count value of the down counter 153 with a negative sign becomes a phase difference. If the sign of the phase difference is still negative even after phase differences are averaged, a clock width set in the clock width register 160 is shorter than a clock width T', so that the phase difference is advanced. With this arrangement, accurate demodulation can be performed by a clock which can perform accurate phase locking with an input reproduced signal, gradually traces the relative speed variations between the reproduction head and the recording medium, and which is free from a reproduced signal fluctuation caused by damage and dust on the recording medium.

According to the second embodiment of the present invention, since the pulse intervals of the reproduced output signals are averaged, the period of the demodulation clock is less susceptible to adverse influences of jitter. Although the reproduced output signal is normally phase-locked with the demodulation clock, the phase is selectively shifted a little for an input having a large jitter component, thereby generating a demodulation clock almost free from variations caused by jitter.

In the second embodiment as in the first embodiment, a phase error amount is calculated by averaging phase differences. However, another calculation method such as a square averaging method may be used. Any method corresponding to a jitter distribution can be used. An averaging method is used as an algorithm for calculating pulses. However, a method of predicting a pulse width variation of a reproduced output signal, i.e., another algorithm such as a square averaging method may be used, as a matter of course. In the above embodiments, the normal range is set to be ±25% range. However, the value of the normal range is not limited to this, but can be replaced with another value which allows variable traceability.

According to the present invention, as has been described in detail above, variations in input pulse width caused by the relative speed variations between the read head and the recording medium can be traced, and influences of pulse variations and omissions caused by damage and dust on the recording medium can be minimized. At the same time, signal variations can be gradually traced. Recording data can be accurately demodulated. In addition, the modulation clock can be immediately phase-locked with a reproduced output signal.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A digital signal reproducing apparatus comprising:
fundamental period calculating means for calculating a fundamental period in accordance with a plurality of pulses including reproduction target pulses included in binary reproduced output signal pulses sequentially input as digital signal pulses to be reproduced;
clock generating means for generating a demodulation clock having the fundamental period calculated by said fundamental period calculating means and synchronized with each of the reproduction target pulses with a predetermined width;
synchronizing means for generating a sync signal representing a phase of a reproduction target pulse when a difference in phase between the reproduction target pulse and the demodulation clock is small and a sync signal representing a phase shifted by a predetermined value form a pulse of a reproduction target pulse when a difference in phase between the reproduction target pulse and the demodulation clock is large, and outputting the sync signal to said clock generating means; and
demodulating means for sequentially demodulating the binary reproduced signal pulses in accordance with the demodulation clock form said clock generating means, the demodulation clock being synchronized with each of the reproduction target pulses with the predetermined width by said synchronizing means.

2. An apparatus according to claim 1, wherein said fundamental period calculating means comprises:
pulse interval extracting means for extracting pulse interval values between the binary reproduced output signal pulses;
pulse multiple detecting means for detecting multiple values corresponding to the fundamental periods defined by the pulse interval values extracted by said pulse interval extracting means;
memory means for storing a predetermined number of pulse interval values extracted by said pulse interval extracting means and a predetermined number of multiple values detected by said pulse multiple detecting means; and
arithmetic means for reading out the predetermined number of pulse interval values and the predetermined number of multiple values from said memory means and calculating a new fundamental period value on the basis of the pulse interval values and the multiple values for the plurality of predetermined sequential reproduction target pulses.

3. An apparatus according to claim 2, wherein said arithmetic means comprises:
pulse length register means for latching the pulse interval value from said pulse interval extracting means and supplying the latched pulse interval value to said memory means;
multiple register means for latching the multiple value from said pulse multiple detecting means and supplying the latched multiple value to said memory means;
pulse length adder means for adding the pulse interval value latched by said pulse length register means and the predetermined number of pulse interval values stored in said memory means;
multiple adder means for adding the multiple value latched by said multiple register means to the predetermined number of multiple values stored in said memory means; and divider means for dividing an output from the pulse length adder means by an output from said multiple adder means.

4. An apparatus according to claim 2, wherein said clock generating means comprises:
   fundamental period register means for latching the new fundamental period value from said arithmetic means and outputting a $1/N_1$ or $1/N_2$ value (wherein $N_1$ and $N_2$ are natural numbers satisfying a condition $N_1 < N_2$) of the new fundamental period value in accordance with a state of a period switching signal;
   down counter means for lading an output from said fundamental period register means on the basis of a sync signal to perform a count-down operation and performing a count-down operation again on the basis of a count-down end signal; and
   toggle flip-flop means for inverting an output in response to the count-down end signal from said down counter means to obtain the demodulation clock, said toggle flip-flop means being reset in response to the sync signal to synchronize the demodulation clock with the sync signal.

5. An apparatus according to claim 4, wherein said synchronizing means comprises:
   fundamental period register means for latching the new fundamental period value form said arithmetic means and outputting a $1/N_2$ value ($N_2$ is a natural number) of the latched new fundamental period value;
   inversion detector means for detecting leading and trailing edges of the demodulation clock from said clock generating means to obtain a load pulse;
   trailing edge detector means for obtaining a sync pulse synchronized with a trailing edge of the binary reproduced output signal pulse;
   down counter means for loading an output from said fundamental period register means in response to the load pulse from said inversion detector means to perform a count-down operation; and
   logic circuit group means for outputting a sync pulse as the sync signal when the sync pulse falls within a $\pm(1/N_2 \times 100\%)$ range at the trailing edge of the demodulation clock in accordance with a count-down end signal from said down counter means, the demodulation clock from said clock generating means, and the sync pulse from said trailing edge detector means, and for outputting the sync pulse as the sync signal and the period switching signal when the sync pulse falls outside the $\pm(1/N_2 \times 100\%)$ range.

6. An apparatus according to claim 2, wherein said arithmetic means divides a sum of a predetermined number of sequential pulse interval values by a sum of the multiple values on the basis of the pulse interval value and the multiple value respectively supplied form said pulse interval extraction means and said pulse multiple detecting means, and a plurality of previous pulse interval values and a plurality of previous multiple values which are already stored in said memory means, to calculate an average period value.

7. A digital signal reproducing apparatus comprising:
   fundamental period calculating means for calculating a fundamental period in accordance with a plurality of pulses including reproduction target pulses included in binary reproduced output signal pulses sequentially input as digital signal pulses to be reproduced;
   clock generating means for generating a demodulation clock having the fundamental period calculated by said fundamental period calculating means;
   phase error amount detecting means for detecting a phase error amount in accordance with a phase difference between the demodulation clock generated by said clock generating means and a plurality of pulses including the reproduction target pulses;
   synchronizing means for controlling the phase error amount of a generation timing of the demodulation clock from said clock generating means to a predetermined value in accordance with the phase error amount detected by said phase error amount detecting means so that the demodulation clock generated by said clock generating means is synchronized with each of the reproduction target pulses; and
   demodulating means for sequentially demodulating the binary reproduced output signal pulses in accordance with the demodulation clock from said clock generating means, the demodulation clock being synchronized with each of the reproduction target pulses with the predetermined phase error amount by said synchronizing means.

8. An apparatus according to claim 7, wherein said synchronizing means includes means for, when the phase error amount detected by said phase error amount detecting means is not more than a predetermined value, controlling the generation timing of the demodulation clock from said clock generating means so that the demodulation clock generated by said clock generating means is synchronized with the reproduction target pulse, and for, when the phase error amount detected by said phase error detecting means is larger than the predetermined value, controlling a phase of the demodulation clock from said clock generating means so that the demodulation clock is synchronized with the reproduction target pulse by shifting the phase of the demodulation clock generated by said clock generating means in accordance with the phase error amount.

9. An apparatus according to claim 7, wherein said fundamental period calculating means comprises:
   interval extracting means for extracting pulse interval values between the binary reproduced output signal pulses;
   pulse multiple detecting means for detecting multiple values corresponding to the fundamental periods defined by the pulse interval values extracted by said pulse interval extracting means;
   memory means for storing a predetermined number of pulse interval values extracted by said pulse interval extracting means and a predetermined number of multiple values detected by said pulse multiple detecting means; and
   arithmetic means for reading out the predetermined number of pulse interval values and the predetermined number of multiple values from said memory means and calculating a new fundamental period value on the basis of the pulse interval values and the multiple values for the plurality of predetermined sequential reproduction target pulses.

10. An apparatus according to claim 9, wherein said arithmetic means comprises:
    pulse length register means for latching the pulse interval value from said pulse interval extracting means and supplying the latched pulse interval value to said memory means;

multiple register means for latching the multiple value from said pulse multiple detecting means and supplying the latched multiple value to said memory means;

pulse length adder means for adding the pulse interval value latched by said pulse length register means and the predetermined number of pulse interval values stored in said memory means;

multiple adder means for adding the multiple value latched by said multiple register means to the predetermined number of multiple values stored in said memory means; and divider means for dividing an output from the pulse length adder means by an output from said multiple adder means.

11. An apparatus according to claim 9, wherein said clock generating means comprises:

fundamental period register means for latching the new fundamental period value from said arithmetic means and outputting a $1/N_1$ or $1/N_2$ value (where $N_1$ and $N_2$ are natural numbers satisfying a condition $N_1 < N_2$) of the new fundamental period value in accordance with a state of a period switching signal;

down counter means for loading an output from said fundamental period register means on the basis of a sync signal to perform a count-down operation and performing a count-down operation again on the basis of a count-down end signal; and toggle flip-flop means for inverting an output in response to the count-down end signal from said down counter means to obtain the demodulation clock, said toggle flip-flop means being reset in response to the sync signal to synchronize the demodulation clock with the sync signal.

12. An apparatus according to claim 11, wherein said phase error amount detecting means comprises:

fundamental period register means for latching the new fundamental period value from said arithmetic means and outputting a $1/N_2$ value ($N_2$ is a natural number) of the latched new fundamental period value;

inversion detector means for detecting leading and trailing edges of the demodulation clock from said clock generating means to obtain a load pulse;

trailing edge detector means for obtaining a reproduced output pulse synchronized with a trailing edge of the binary reproduced output signal pulse;

first down counter means for loading an output from said fundamental period register means in response to the load pulse from said inversion detector means to perform a count-down operation;

second down counter means for loading the output from said fundamental period register means in response to the load pulse from said inversion detector means to start a count-down operation upon completion of the count-down operation of said first down counter means;

phase comparator means for comparing a phase relationship among count values sequentially input form said first and second down counter means, the reproduced output pulse from said trailing edge detector means, and a reference phase value and outputting the reproduced output pulse as the sync signal when a phase difference output is absent;

phase difference memory means for storing a count value of said first or second down counter means as a cumulative phase difference upon reception of the reproduced output pulse when the phase difference output from said phase comparator means is present;

averaging circuit means for averaging the cumulative phase differences from said phase difference memory means; and correcting means for adding an average phase difference from said averaging circuit means to the output from said fundamental period register means to output a sync signal whose phase difference is corrected.

13. A digital signal reproducing apparatus comprising:

fundamental period calculating means for calculating a fundamental period in accordance with a plurality of pulses including reproduction target pulses included in binary reproduced output signal pulses sequentially input as digital signal pulses to be reproduced;

synchronizing means for generating a sync signal substantially representing a phase of each of the reproduction target pulses;

clock generating means for generating a demodulation clock having the fundamental period calculated by said fundamental period calculating means and synchronized with each of the reproduction target pulses with a predetermined width in response to the sync signal input from the synchronizing means; and demodulating means for sequentially demodulating the binary reproduced output signal pulses in accordance with the demodulation clock form said clock generating means, the demodulation clock being synchronized with each of the reproduction target pulses with the predetermined width by said synchronizing means.

14. An apparatus according to claim 13, wherein said fundamental period calculating means comprises:

pulse interval extracting means for extracting pulse interval values between the binary reproduced output signal pulses;

pulse multiple detecting means for detecting multiple values corresponding to the fundamental periods defined by the pulse interval values extracted by said pulse interval extracting means;

memory means for storing a predetermined number of pulse interval values extracted by said pulse interval extracting means and a predetermined number of multiple values detected by said pulse multiple detecting means; and arithmetic means for reading out the predetermined number of pulse interval values and the predetermined number of multiple values form said memory means and calculating a new fundamental period value on the basis of the pulse interval values and the multiple values for the plurality of predetermined sequential reproduction target pulses.

15. An apparatus according to claim 14, wherein said arithmetic means comprises:

pulse length register means for latching the pulse interval value from said pulse interval extracting means and supplying the latched pulse interval value to said memory means;

multiple register means for latching the multiple value from said pulse multiple detecting means and supplying the latched multiple value to said memory means;

pulse length adder means for adding the pulse interval value latched by said pulse length register means and the predetermined number of pulse interval values stored in said memory means;

multiple adder means for adding the multiple value latched by said multiple register means to the predetermined number of multiple values stored in said memory means; and divider means for dividing an output from the pulse length adder means by an output from said multiple adder means.

16. An apparatus according to claim 14, wherein said clock generating means comprises:

fundamental period register means for latching the new fundamental period value from said arithmetic means and outputting a $1/N_1$ or $1/N_2$ value (wherein $N_1$ and $N_2$ are natural numbers satisfying a condition $N_1 < N_2$) of the new fundamental period value in accordance with a state of a period switching signal;

down counter means for loading an output from said fundamental period register means on the basis of a sync signal to perform a count-down operation and performing a count-down operation again on the basis of a count-down end signal; and toggle flip-flop means for inverting an output in response to the count-down end signal from said down counter means to obtain the demodulation clock, said toggle flip-flop means being reset in response to the sync signal to synchronize the demodulation clock with the sync signal.

17. An apparatus according to claim 16, wherein said synchronizing means comprises:

fundamental period register means for latching the new fundamental period value from said arithmetic means and outputting a $1/N_2$ value ($N_2$ is a natural number) of the latched new fundamental period value;

inversion detector means for detecting leading and trailing edges of the demodulation clock from said clock generating means to obtain a load pulse;

trailing edge detector means for obtaining a sync pulse synchronized with a trailing edge of the binary reproduced output signal pulse;

down counter means for loading an output from said fundamental period register means in response to the load pulse from said inversion detector means to perform a count-down operation; and logic circuit group means for outputting a sync pulse as the sync signal when the sync pulse falls with a $\pm(1/N_2 \times 100\%)$ range at the trailing edge of the demodulation clock in accordance with a count-down end signal from said down counter means, the demodulation clock form said clock generating means, and the sync pulse from said trailing edge detector means, and for outputting the sync pulse as the sync signal and the period switching signal when the sync pulse falls outside the $\pm(1/N_2 \times 100\%)$ range.

* * * * *